US010785296B1

(12) United States Patent
Allison

(10) Patent No.: US 10,785,296 B1
(45) Date of Patent: Sep. 22, 2020

(54) DYNAMIC EXCHANGE OF DATA BETWEEN PROCESSING UNITS OF A SYSTEM

(71) Applicant: X DEVELOPMENT LLC, Mountain View, CA (US)

(72) Inventor: David Allison, San Ramon, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 584 days.

(21) Appl. No.: 15/454,437

(22) Filed: Mar. 9, 2017

(51) Int. Cl.
    *H04L 29/08* (2006.01)
    *H04L 29/06* (2006.01)

(52) U.S. Cl.
    CPC ...... *H04L 67/1095* (2013.01); *H04L 65/4076* (2013.01); *H04L 69/16* (2013.01)

(58) Field of Classification Search
    CPC ........ G06F 16/437; G06F 16/48; G06F 13/28; G06F 16/174; G06F 16/4387; G06F 16/7844; G06F 17/00; H04L 65/4076; H04L 63/065; H04L 51/12; H04L 63/04; H04L 63/062; H04L 63/123; H04L 51/02; H04L 51/04; H04L 51/28; H04L 65/4084; H04L 67/42; H04L 51/14; H04L 65/4069; H04L 47/722; H04L 51/06; H04L 67/02; H04L 67/26; H04L 41/50; H04L 67/00; H04L 12/1859; H04L 51/046; H04L 51/18; H04L 67/2809; H04L 69/14; H04L 12/1813; H04L 12/2827; H04L 2012/285; H04L 65/4015; H04L 67/12; H04L 29/06; H04L 29/06027; H04L 51/36; H04L 63/0227; H04L 65/1006; H04L 65/1016; H04L 65/80; H04L 67/06; H04L 67/14; H04L 67/22; H04L 67/2842;
(Continued)

(56) References Cited

U.S. PATENT DOCUMENTS

| 5,617,537 A | 4/1997 | Yamada et al. |
| 6,411,987 B1 | 6/2002 | Steger et al. |
| 7,010,573 B1 | 3/2006 | Saulpaugh et al. |

(Continued)

OTHER PUBLICATIONS

Meier, L., Honegger, D., & Pollefeys, M. (May 2015). PX4: A node-based multithreaded open source robotics framework for deeply embedded platforms. In Robotics and Automation (ICRA), 2015 IEEE International Conference on (pp. 6235-6240). IEEE.

*Primary Examiner* — Djenane M Bayard
(74) *Attorney, Agent, or Firm* — Middleton Reutlinger

(57) ABSTRACT

Techniques are provided for making data stored in channels of shared memory available across a communication network that couples multiple distinct processing units (e.g., of a robot). In various implementations, a channel may be established in shared memory of a first processing unit. A publisher process executing on the first processing unit may publish data to the channel, and a remote subscriber process executing on a second processing unit may subscribe to the channel. A persistent network connection over a communication network may be established between the first and second processing units. Data published to the channel by the publisher process may be read directly from the local memory of the first processing unit by or on behalf of one or more local subscriber processes, and may be transmitted over the communication network to the remote subscriber process using the persistent network connection.

20 Claims, 4 Drawing Sheets

(58) Field of Classification Search
CPC ... H04L 67/306; H04L 67/322; H04L 67/325; H04L 69/329; H04L 9/321; H04L 9/3247; H04L 9/3297
See application file for complete search history.

(56) References Cited

U.S. PATENT DOCUMENTS

| | | |
|---|---|---|
| 7,072,967 B1 | 7/2006 | Saulpaugh et al. |
| 7,706,895 B2 | 4/2010 | Callaghan |
| 2004/0019637 A1* | 1/2004 | Goodman ............... H04L 51/04 709/204 |
| 2004/0111512 A1 | 6/2004 | Barth |
| 2006/0168331 A1 | 7/2006 | Thompson et al. |
| 2009/0024817 A1* | 1/2009 | Oved ..................... G06F 13/28 711/170 |
| 2010/0322236 A1* | 12/2010 | Vimpari ............. H04L 12/1886 370/389 |
| 2011/0258049 A1* | 10/2011 | Ramer ................... G06Q 30/02 705/14.66 |
| 2014/0325574 A1* | 10/2014 | Mendelson ........ H04N 21/4223 725/109 |

\* cited by examiner

US 10,785,296 B1

DYNAMIC EXCHANGE OF DATA BETWEEN PROCESSING UNITS OF A SYSTEM

BACKGROUND

Systems such as robots may include multiple distinct processing units that communicate with each other over various types of communication networks (e.g., via a local Ethernet switch). Each processing unit may include, for example, one or more processors and memory operably coupled with the one or more processors. The memory of a given processing unit may include instructions that, when executed by the one or more processors, cause the given processing unit to execute one or more processes that perform one or more robot-related functions. For example, one processing unit may act as a real-time controller whose function is to operate one or more motors or other actuators/joints associated with the robot. Another processing unit may act as a perception unit whose function is to use one or more graphical processing units ("GPUs") to execute complex algorithms on data received from one or more sensors (e.g., image sensors, depth sensors, etc.) and draw various conclusions about the robot's environment. Another processing unit may have a function of applying machine learning models (e.g., neural networks) to various data to draw a variety of conclusions and/or make various decisions for the robot. Yet another processing unit may act as a logging unit that stores, in a log, data related to performance of one or more components of the robot.

During operation of the robot these multiple processing units may frequently exchange data with each other. When multiple functions are performed by a single processing unit, an efficient way to exchange data between processes that perform the respective functions is via interprocess communication ("IPC") using shared memory of the single processing unit. However, data stored in the shared memory is not easily accessible to processes executing on remote/separate processing units that are nonetheless integral with the robot. While it is possible to manually create a separate process (or reconfigure an existing process) to read data from shared memory of one processing unit and make the data available to other processing units over a network, this approach may require extensive human intervention, and is not adaptable or scalable.

SUMMARY

The present disclosure is generally directed to techniques for making data stored in channels of shared memory available across a communication network, such as a communication network that communicatively couples multiple distinct processing units of a robot. In various implementations, a system such as a robot may include multiple distinct processing units (e.g., processors with memory, field-programmable gate arrays ("FPGA"), application-specific integrated circuits ("ASIC"), etc.) that communicate with each other over a communication network that is integral with the system (e.g., integral with the robot). Each processing unit may be configured to perform (e.g., execute one or more processes that perform) one or more functions, such as real-time control, perception, machine learning model application, logging, etc. When a particular process executing on a given processing unit performs a function that produces data of interest to other processes—whether the other processes execute on the same processing unit or on a remote processing unit—a so-called "channel" may be established on which the data is "published" by the particular process (referred to herein as the "publisher" process). In some implementations, the channel may take the form of a portion of local memory of the given processing unit that is used as shared memory. Other processes that desire this data may "subscribe" to the channel. Thus, the publisher process may publish data to the channel, and one or more so-called "subscriber" processes may read data from the channel, in many instances without the publisher process and the one or more subscriber processes interacting directly.

A subscriber process may read data from a channel in various ways. If the same processing unit that executes a subscriber process also hosts a channel to which the subscriber process is subscribed, the subscriber process may use one or more IPC interfaces (e.g., shared memory) to read the data from the subscribed channel directly. However, if a subscriber process executes on a different processing unit than that which hosts the channel, then the subscriber process may obtain data from the channel over the communication network that communicatively couples the processing units. In some implementations, a persistent network connection may be established between a subscriber process and a remote processing unit that hosts the shared memory containing the channel to which the subscriber process is subscribed. As used herein, a network connection is deemed "persistent" in that it may be established and maintained (e.g., kept active or in place) so long as it is needed. As will be described below in more detail, in various implementations, a persistent network connection may be established on an as-needed basis, e.g., in response to a subscription notification that indicates a remote subscriber process wishes to subscribe to a published channel. The persistent network connection may be kept in place (i.e. persist) until it is no longer needed, e.g., when the remote subscriber process goes offline or otherwise unsubscribes from the published channel. At that point, the persistent network connection may be dropped, closed, etc. In some implementations, the persistent network connection may take the form of a transmission control protocol ("TCP") connection, although this is not required. Whenever a publisher process publishes data to the channel of the remote processing unit, that data may be transmitted (e.g., by a so-called "IPC service" executing on the remote processing unit) via the persistent network connection directly or indirectly to the subscriber process (e.g., without necessarily requiring a new handshake for each publication). While processes are described in examples herein as "publisher" and "subscriber" process, it should be understood that processes executing on processing devices may be both publisher and subscriber processes.

In various implementations, subscriber and publisher processes may be connected dynamically without human intervention or static channel lists. In some implementations, each publisher process may broadcast (or have broadcasted on its behalf), e.g., over the communication network that communicatively couples the multiple processing units, a publication notification that informs all listening processes across the system of a channel to which the publisher will publish its data. Likewise, each subscriber process may broadcast (or have broadcasted on its behalf) a subscription notification that informs all listening processes across the system of one or more channels to which the subscriber process intends to subscribe. In some implementations, one or more of the processing units may execute an instance of the aforementioned IPC service that listens to publication and subscription notifications, and makes appropriate connections when needed.

Suppose a subscriber process executing on a first processing unit wishes to subscribe to a channel that resides in shared memory of a second, remote processing unit. The local subscriber process may broadcast—e.g., via a first instance of the IPC service that executes on the first processing unit—a subscription notification. This subscription notification may be "heard" by a second instance of the IPC service executing on the second processing device. In response, the second instance of the IPC service may establish a persistent network connection (e.g., TCP connection) across the communication network with the subscriber process. Thereafter, data published by a publisher process to the channel may be transmitted by the second IPC service over the persistent network connection directly or indirectly (e.g., via another IPC service) to the subscriber process. In this way, as publisher and subscriber processes broadcast additional publication and/or subscription notifications, additional persistent network connections may be established as needed. If a subscriber process goes offline, the persistent network connection with that subscriber process may be closed. If all remotely-executing subscriber processes go offline, then all the corresponding persistent network connections may also be closed. Any additional data published to the channel thereafter will not be transmitted over the network, which has the advantage of reducing network traffic and potential network collisions. If there are also no locally-executing subscriber processes, the publisher process may cease publishing data to the channel. Likewise, if a channel without any remotely-executed subscriber process receives a subscription notification from a new remotely-executing subscriber process, a new persistent network connection may be established. Accordingly, persistent network connections may be established (or closed) adaptively on an on-demand basis.

In some implementations, a method of exchanging data between a plurality of processing units that are communicatively coupled via a communication network may include: establishing, at a first processing unit of the plurality of processing units, a channel to which a publisher process executing on the first processing unit publishes data, wherein the channel comprises at least a portion of local memory of the first processing unit that is used as shared memory; informing one or more local subscriber processes executing on the first processing unit of a memory address of the channel in the local memory of the first processing unit, wherein the one or more local subscriber processes subscribe to the channel to read data directly from the local memory of the first processing unit at the memory address using interprocess communication; determining that at least one remote subscriber process executing on a second processing unit of the plurality of processing units subscribes to the channel; and establishing, at the first processing unit based on the determining, a persistent network connection over the communication network with the remote subscriber process. In various implementations, data published to the channel by the publisher process may be read directly from the local memory of the first processing unit by or on behalf of one or more of the local subscriber processes and may be transmitted over the communication network to the remote subscriber process using the persistent network connection.

This method and other implementations of technology disclosed herein may each optionally include one or more of the following features.

In various implementations, the method may further include broadcasting a publication notification across the communication network. The publication notification may inform one or more remote processes executing on one or more processing units of the plurality of processing units that the publisher process publishes data on the channel.

In various implementations, the determining may include receiving a subscription notification broadcast across the communication network, wherein the subscription notification informs the publisher process that the remote subscriber process subscribes to the channel.

In various implementations, the persistent network connection may be a transmission control protocol ("TCP") connection. In various implementations, the communication network may be a broadcast network. In various implementations, the plurality of processing units may be integral components of a robot. In various implementations, the channel may be implemented in the local memory of the first processing unit as a ring buffer.

In various implementations, the channel may be a first channel, and the method may further include subscribing the publisher process to a second channel to which another publisher process executing a given processing unit of the plurality of processing units publishes data. In various implementations, the second channel may take the form of at least a portion of local memory of the given processing unit that is used as shared memory.

Other implementations may include a non-transitory computer readable storage medium storing instructions executable by a processor to perform a method such as one or more of the methods described above. Yet another implementation may include a robot that includes at least first and second processing units that are communicatively coupled via a communication network that is integral with the robot, wherein the at least first and second processing units implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
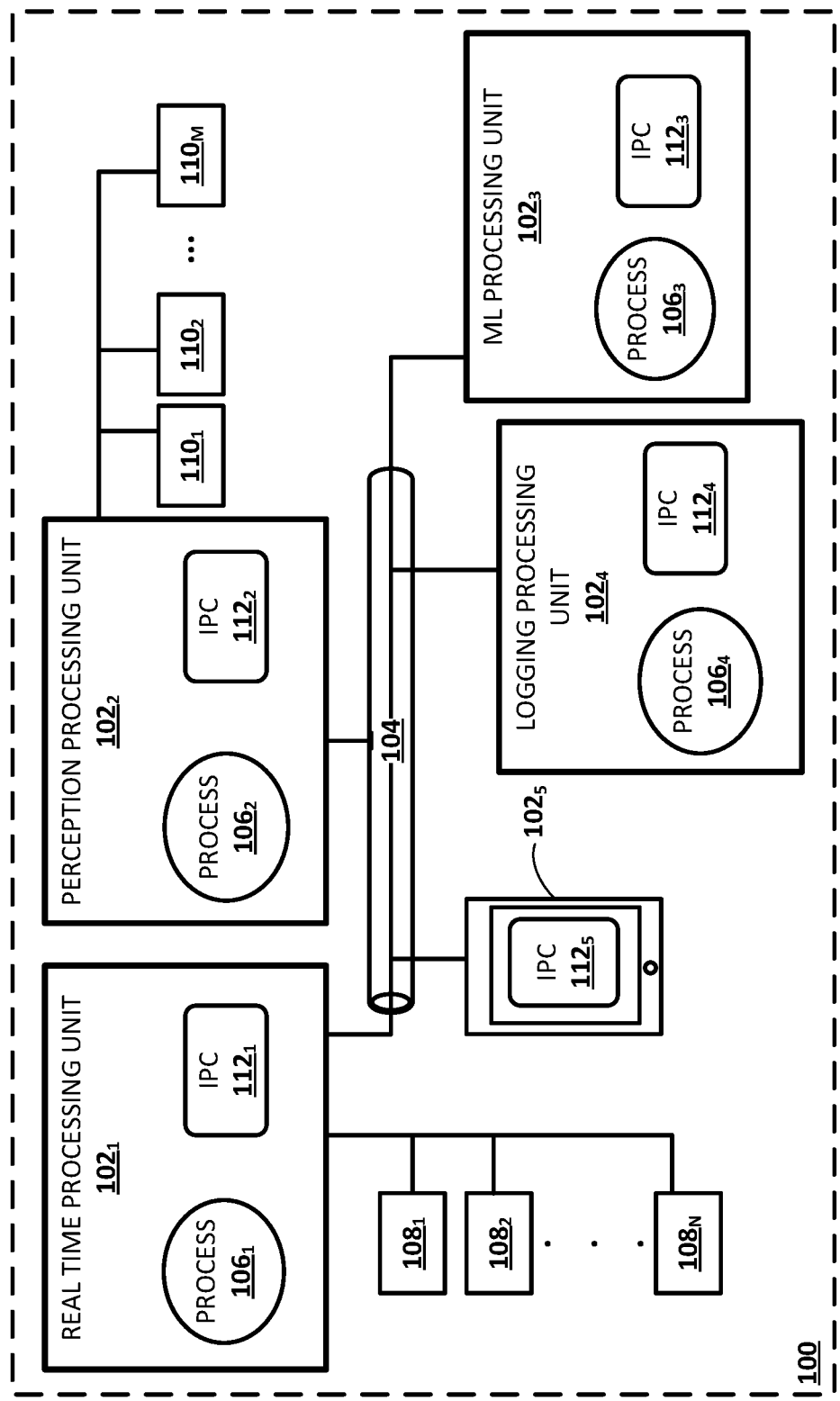
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A system 100 may include a plurality of distinct processing units, five ($102_{1-5}$) which are depicted in FIG. 1, though this is not meant to be limiting, and a system may include any number of distinct processing units 102. In some implementations, one or more processing units 102 may take the form of a field-programmable gate array ("FPGA") or application-specific integrated circuit ("ASIC"). However, for brevity's sake, in examples described herein, processing units 102 generally will take the form of computing devices (such as that described in FIG. 4) that include one or more processors operably coupled with memory, as well as other components (e.g., input/output components, network communication interfaces, etc.) as needed. The memory of a given processing unit 102 may store instructions that cause one or more processors of the processing unit to perform various functions.

While the present disclosure is not so limited, in some implementations, system 100 may take the form of a robot. A robot such as that represented by system 100 may take various forms, including but not limited to a telepresence robot, a robot arm, a humanoid, an animal, an insect, an aquatic creature, a wheeled device, a submersible vehicle, an unmanned aerial vehicle ("UAV"), and so forth. As robots become more complex and autonomous, in many cases robots may include multiple distinct processing units 102, each that is configured to perform one or more functions related to operation of the robot. For example, in FIG. 1, system 100 takes the form of a robot with a variety of processing units 102 that are communicatively coupled via a communication network, which in this example is implemented with an Ethernet switch 104 (although other types of communication networks may be used as well). In some implementations, the communication network may be a broadcast or multicast communication network (e.g., every communication transmitted to the communication network is received by all nodes of the communication network), although this is not required. In various implementations, each processing unit 102 may execute one or more software processes 106 that is configured to perform the aforementioned one or more functions related to operation of the robot.

In various implementations, the multiple processing units $102_{1-5}$ may include, for instance, a real-time processing unit $102_1$ that, e.g., by way of one or more processes $106_1$ executing thereon, is configured to control, in real time, one or more operational components $108_{1-N}$ of the robot. As used herein, an "operational component" 108 of a robot may broadly refer to actuators, motors (e.g., servo motors), joints, shafts, gear trains, pumps (e.g., air or liquid), pistons, drives, end effectors, or other components that may create and/or undergo propulsion, rotation, and/or motion. Some operational components 108 may be independently controllable, although this is not required. In some instances, the more operational components a robot has, the more degrees of freedom of movement it may have. As used herein, "end effector" may refer to a variety of tools that may be operated by a robot in order to accomplish various tasks. For example, some robots may be equipped with an end effector that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector may be removable, and various types of modular end effectors may be installed onto the robot, depending on the circumstances.

A perception processing unit $102_2$ may be configured to receive, e.g., at a perception process $106_2$, data from one or more sensors $110_{1-M}$, and to analyze the sensor data to draw conclusions and/or make decisions related to operation of the robot, about the environment in which the robot is operating, etc. (e.g., localization, mapping, collision avoidance, path planning, etc.) Sensors $110_{1-M}$ may take various forms, including but not limited to 3D laser scanners or other 3D vision sensors (e.g., stereographic cameras used to perform stereo visual odometry) configured to provide depth measurements, two-dimensional cameras, light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $110_{1-M}$ are depicted as being integral with system 100 (and hence, the robot), this is not meant to be limiting. In some implementations, sensors 110 may be located external to, but may be in direct or indirect communication with, the robot, e.g., as stand-alone units or as part of a separate robot control system (not depicted). In some implementations, perception processing unit $102_2$ may provide, e.g., by way of perception process $106_2$, data indicative of its conclusions and/or raw or annotated sensor data to real time processing unit $102_1$, e.g., so that real time control process $106_1$ can control operational components 108 accordingly.

Also depicted in FIG. 1 are (optional) processing units that include a machine learning ("ML" in FIG. 1) processing unit $102_3$, a logging processing unit $102_4$, and a front-end processing unit $102_5$. Machine learning processing unit $102_3$ may execute one or more machine learning processes $106_3$ that are configured to apply trained machine learning models such as various types of neural networks (e.g., convolutional neural networks, etc.) to various data to generate various outputs. For example, in some implementations, machine learning process $106_3$ may be configured to apply one or more trained convolutional neural networks to visual sensor data received from perception processing unit $102_2$. In other implementations, machine learning process $106_3$ and perception process $106_2$ may be executed on a single processing unit 102, or may even be combined into a single process 106.

Logging processing unit $102_4$ may execute one or more logging processes $106_4$ that are configured to log various data related to operation of the robot. For example, in some implementations, logging process $106_4$ may receive sensor data (e.g., via perception processing unit $102_2$ or directly) from sensors 110 and/or operational data from real time control process $106_1$ about operation of one or more operational components 108 (e.g., applied torques, movements, etc.). Logging process $106_4$ may store this received in one or more logs, which may be analyzed for various purposes, such as debugging, operational improvement, robot maintenance, etc.

Front-end processing unit $102_5$ may be operable by a user to control and/or monitor operation of the robot. In FIG. 1, front-end processing unit $102_5$ takes the form of a tablet or smartphone, but this is not required, and any type of human-operable computing device may be used. In some implementations, a user may operate one or more user interfaces rendered by front-end processing unit $102_5$ to cause the robot to perform various actions, monitor operation of the robot (e.g., by viewing/analyzing one or more logs created by logging process $106_4$), and so forth.

As noted above, processes 106 operating on the multiple distinct processing units 102 may need to exchange data. For example, if operational data generated by a particular operational component 108 is desired (e.g., for debugging purposes), logging process $106_4$ may need to obtain the operational data, e.g., from real time processing unit $102_1$. When multiple processes are executed on a single processing unit 102, an efficient way to exchange data between processes that perform the respective functions is via interprocess communication ("IPC"), e.g., using shared memory of the single processing unit 102. However, data stored in the shared memory is not easily accessible to processes executing on remote/separate processing units 102 that are nonetheless integral with the robot. While it is possible to manually create a separate process (or reconfigure an existing process) to read data from shared memory of one processing unit 102 and make the data available to other processing units 102 over a network (e.g., 104), this approach may require extensive human intervention, and is not adaptable or scalable.

Accordingly, in various implementations, each processing unit 102 may execute a so-called IPC service (simply "IPC" in FIG. 1) 112. The IPC services $112_{1-5}$ may be configured to facilitate exchange, between the multiple processing units, of data that may be stored in shared memory of individual processing units. Rather than manually creating/installing ad hoc processes to extract data from shared memory for sharing across the communication network (which may entail creation of static lists of persistent network connections between processing units), each IPC service 112 may be configured to dynamically create persistent network connections with remote processing units on an as-needed basis. In some implementations, the IPC services 112 may implement a dynamic publish/subscribe paradigm between various processes 106 executing on processing units 102. Under this paradigm, processes 106 can publish data (as so called "publisher" processes) desired by other processes, and/or subscribe to desired data (as so-called "subscriber" processes) that is generated by other processes. The IPC services 112 may handle establishment of logical connections between the subscriber and publisher processes. In some implementations, an IPC service 112 may be a distinct process that is exposed to processes 106 via an IPC application programming interface ("API"). Accordingly, the processes 106 may be able to call various functions provided by the IPC API to subscribe to channels, publish to channels, announce subscription/publication, and so forth. In some implementations, real-time processing unit $102_1$ may not execute an IPC service locally.

In some implementations, a publisher process 106 may publish data it generates (which may be of interest to other process(es)) to a so-called "channel." In various implementations, a channel may take the form of at least a portion of local memory of a processing unit that executes the publisher process. In some implementations, that portion of the local memory may be used as shared memory so that subscriber processes executing on the same processing unit may read the data directly from the shared memory, e.g., using IPC. At the same time, another remote subscriber process may not execute on the same processing unit, and thus may not have the ability to directly read the same shared memory. Accordingly, in various implementations, the local IPC service 112 may establish a persistent network connection over the communication network 104 with the remote subscriber process (or at least with the processing unit that executes the remote subscriber process).

Figure 2:
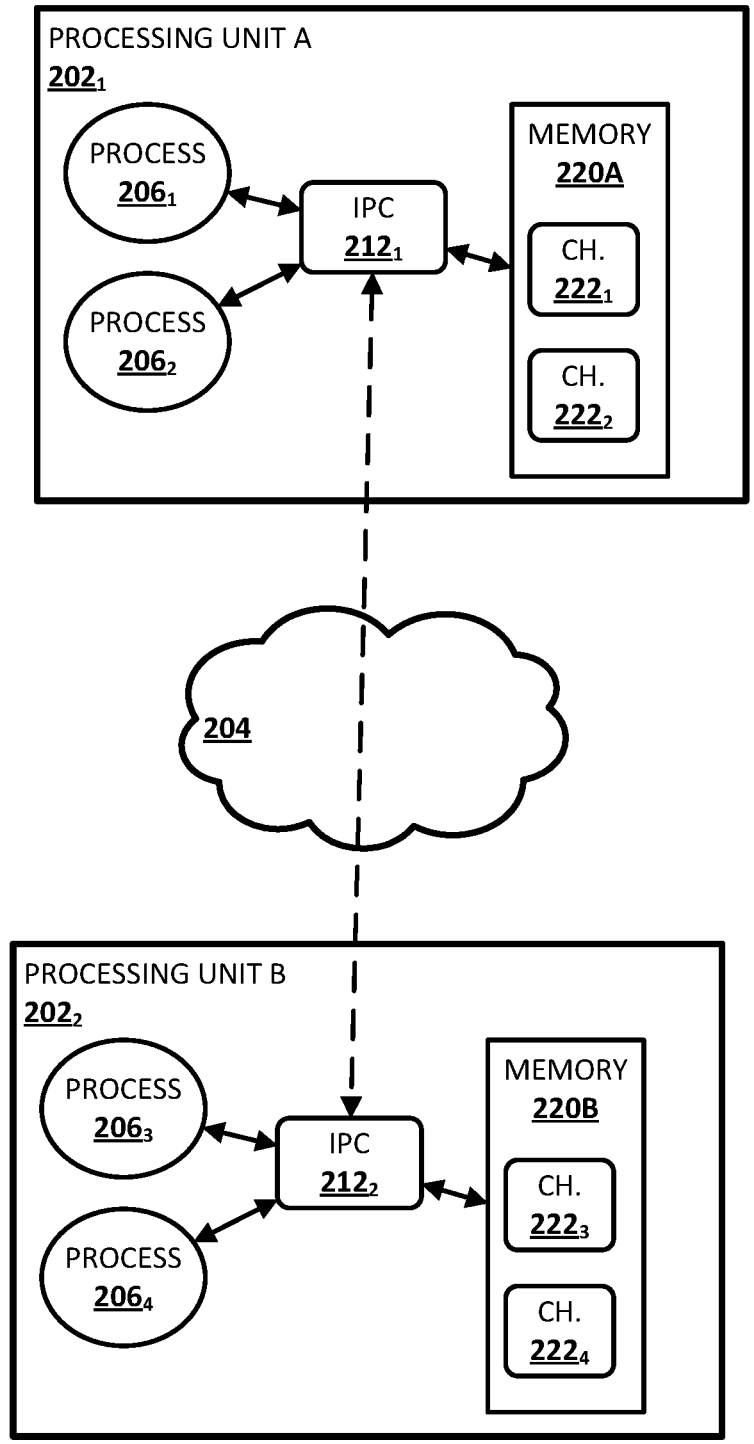
FIG. 2 depicts an example of how data may be exchanged using publish/subscribe techniques described herein, in accordance with various implementations.

FIG. 2 depicts an example of how processes 206 executing on distinct processing units 202 may exchange data over a communication network 204 using techniques described herein. In FIG. 2, two processing units, processing unit A $202_1$ and processing unit B $202_2$, are depicted. These processing units are depicted generically because the operations they are depicted as performing in FIG. 2 could be performed by any of the processing units $102_{1-5}$ of FIG. 1. In this example, processing unit A $202_1$ executes two processes, $206_1$ and $206_2$, and processing unit B $202_2$ executes two processes, $206_3$ and $206_4$. However, this is not meant to be limiting, and a processing unit may execute any number of processes. Processing unit A $202_1$ also executes an IPC service $212_1$, and processing unit B $202_2$ executes another IPC service $212_2$. Additionally, processing unit A $202_1$ includes local memory 220A, and processing unit B $202_2$ includes local memory 220B.

While not depicted in FIG. 1 or FIG. 2, in some implementations, instead of executing a full-fledged IPC service locally, a processing unit may execute what will be referred to herein as an "IPC network client" that enables other locally-executing processes to subscribe to remotely-hosted channels, but does not necessarily enable locally-executed processes to publish to a locally-hosted shared memory. This may be the case where, for instance, a particular processing unit will not be generating data of interest to other components, but may execute one or more processes that utilize data received from other components. For example, logging processing unit $102_4$ of FIG. 1 may not necessarily execute processes that publish data of interest to other processes. Accordingly, in some implementations, rather than executing IPC service $112_4$, logging processing unit $102_4$ may execute an IPC network client.

Process $206_1$ may publish data it generates to a first channel $222_1$. Process $206_2$ may publish data it generates to a second channel $222_2$. Process $206_3$ may publish data it generates to a third channel $222_3$. Process $206_4$ may publish data it generates to a fourth channel $222_4$. Each channel may take the form of a portion of local memory 220 that is used as shared memory. As indicated by the solid arrows, each process 206 may be communicatively coupled with an IPC service 212 via one or more intra-processing unit links. These intra-processing unit links may take various forms, such as UNIX sockets, etc.

Suppose process $206_2$ desires to publish data to a channel. In various implementations, process $206_2$ may transmit, to locally-executing IPC service $212_1$ over the aforementioned intra-processing unit links, what will be referred to herein as a publication notification. In some implementations, process $206_2$ may transmit the publication notification by calling what will be referred to herein as a "PublishToChannel" function of the aforementioned IPC API. The PublishToChannel function may receive as input, among other possibilities, a channel name (which in some implementations may be an arbitrarily-selected string or number), and may return what will be referred to herein as a "channel identifier" (which in some implementations may be a 32-bit integer, though this is not required). In some implementations, the PublishToChannel function may also receive as input a number of slots in the channel, and slot size, though this is not required. In some implementations, a slot may be a fixed sized buffer that is the maximum size of any message that can be published on the channel. Thus, the amount of memory allocated to the channel may be the number of slots multiplied by the slot size. In some implementations, the PublishToChannel function may also receive as input what will be referred to as a message type. This allows subscriber processes to ask what type of messages are published to the channel. In some implementations, the PublishToChannel function may return (in some cases as an output parameter) the channel identifier (which in the case of process $206_2$ refers to channel $222_2$).

Subsequently, when process $206_2$ wishes to publish a message to the channel identified by the returned channel identifier (i.e. channel $222_2$), process $206_2$ may call an IPC API function that will be referred to herein as a "SendMessage" function. The SendMessage function may receive as input the desired channel identifier and a buffer containing the message to be sent. In some implementations, the result of calling the SendMessage function may be that the message is sent to the locally-executing IPC service $212_1$. For locally-executing subscriber processes (e.g., process $206_1$), the locally-executing IPC service $212_1$ may store the message in shared memory at a location that corresponds, for example, to one of the aforementioned slots.

Suppose now that process $206_1$ desires the data published by process $206_2$ to channel $222_2$. In various implementations, process $206_1$ may subscribe to channel $222_2$, e.g., by transmitting, to locally-executing IPC $212_1$, what will be referred to herein as a "subscription notification." In some implementations, process $206_1$ may transmit the subscription notification by calling an IPC API function that will be referred to herein as a "Sub scribeToChannel" function. In some such implementations, the SubscribeToChannel function may take a name of the desired channel (which may be shared between subscriber and publisher processes 206), as well as other information that is implementation-specific, and may return the channel identifier associated with the channel. The locally-executing IPC service $212_1$, by virtue of having originally established channel $222_2$, has all the information necessary to return the channel identifier associated with channel $222_2$.

When process $206_1$ seeks to read a message from channel $222_2$, it may call an IPC API function that will be referred to herein as "ReceiveMessage." In some implementations, the ReceiveMessage function may take as input the channel identifier of the channel from which the message is to be obtained. In some implementations, the ReceiveMessage function may also take as input an address of a pointer that will be set to an address of the received data (or message), although this is not required. In some implementations, the ReceiveMessage function may return a value that is indicative of success or failure, such as a positive number for success, a zero for no data received, and a negative number for failure. If the channel is channel $222_2$, which is hosted in shared memory by the same processing unit $202_1$ that executes process $206_1$, then IPC service $212_1$ (or process $206_1$ itself) may simply read the message from a shared memory address associated with channel $222_2$ and, for instance, write the message to the address pointed to by the aforementioned pointer.

In the example above, processes $206_1$ and $206_2$ exchanged data using IPC by way of IPC service $212_1$ reading from shared memory locations, as both processes and their channels are hosted by processing unit A $202_1$. However, techniques described herein are not limited to intra-processing unit data exchange. In some implementations, IPC services 212 (and 112) may employ what will be referred to herein as a "publisher identification protocol" ("PIP") to ensure that all IPC services (112, 212) on the system are aware of what channels are published, and on which processing units (102, 202) those channels are published.

In various implementations, the PIP protocol may include functions for transmitting two basic message types: one that asks who publishes a particular channel, and another that announces (e.g., broadcasts using a user datagram protocol, or "UDP," message) a published channel. In some implementations, PIP messages may be transmitted to a local broadcast IP address (e.g., 255.255.255.255) so that all processing units (102, 202) in a system, and in particular all IPC services (112, 212) executing on those processing units, see the PIP messages. Thus, whenever a publisher process announces that it will publish to a channel (e.g., by transmitting a publication notice via the PublishToChannel function described previously), all IPC services are made aware of that so that they can connect subscriber processes to the channel. In some implementations, the publication notice may include a port number, e.g., a UDP port, upon which the local IPC service 212 listens for incoming subscription requests for a given channel. In some implementations, each channel may be assigned its own port number.

Whenever a subscriber process announces that it will subscribe to a channel (e.g., via the SubscribeToChannel function described previously), all IPC services are made aware of that so that they can connect the subscriber process to any existing publisher processors that publish to the channel, or to any future publisher processes that publish to the channel later. In some implementations, an IPC service 212 transmitting the subscription notification on behalf of a subscriber process may transmit a UDP message to a port number that was previously assigned to the channel, e.g., by invocation of the PublishToChannel function described previously. In some implementations, before transmitting the subscription notification, the subscriber process may allocate a TCP port, set it in listening mode, and call accept( ) on it. When the IPC service 212 acting on behalf of the publisher process sees this incoming subscription notification, it may connect to the newly-allocated TCP port. Thereafter, the established TCP connection may be used for exchanging messages.

The following example illustrates how a subscriber process may obtain access to data on a channel that is hosted by a remote processing unit. Suppose process $206_3$ executing remotely on processing unit B $202_2$ also desires data published to channel $222_2$ by process $206_2$. In various implementations, process $206_3$ may call the aforementioned IPC API function, SubscribeToChannel, to transmit a subscription notification to IPC service $212_2$ executing on processing unit B $202_2$ (and as noted above, in some cases to a UDP port previously associated with the channel). IPC service $212_2$ may establish a persistent network connection (e.g., a TCP connection, indicated in FIG. 2 by the dashed two-way arrow) using a TCP port that was allocated by process $206_3$ prior to (or at least contemporaneously with) process $206_3$ transmitting the subscription notification.

In various implementations, whenever process $206_2$ publishes a message to channel $222_2$, IPC service $212_1$ may also transmit a copy of the message over the persistent network communication link (again, the dashed two-way arrow in FIG. 2) to IPC service $212_2$ executing on processing unit B $202_2$ (or in some implementations, directly to process $206_3$). In instances in which channel $222_2$ has no local subscribers, in some implementations, the message may be transmitted by IPC service $212_1$ to processing unit B $202_2$ without being written locally to channel $222_2$. In other implementations, the message may be written to channel $222_2$ and maintained at least temporarily, e.g., so that later subscriber processes can still read the message.

In some implementations, channels described herein may be lossy. For example, channels may be implemented as ring buffers on which new messages are written until slots run out. Then, the slots containing the oldest messages may be overwritten (e.g., FIFO) by new messages. Additionally, in some implementations, subscriber processes may be configured to nominally read the newest message in a channel, or the newest unread message in the channel.

Subscriber processes may read all messages published to a channel, or only some messages read to a channel. In some implementations, the IPC API mentioned previously may include what will be referred to herein as a "Poll" function. The Poll function may be called by a subscriber process to see if there are any messages waiting for it on any channels to which it is subscribed. In some implementations, if no messages are waiting for it, the subscriber process may wait for some predetermined time interval for messages to come in. The Poll function may return a list of one or subscribed channels (e.g., channel identifiers) on which there is a new message to read. The subscriber process may then call ReceiveMessage on those one or more channels to receive the published messages.

Figure 3:
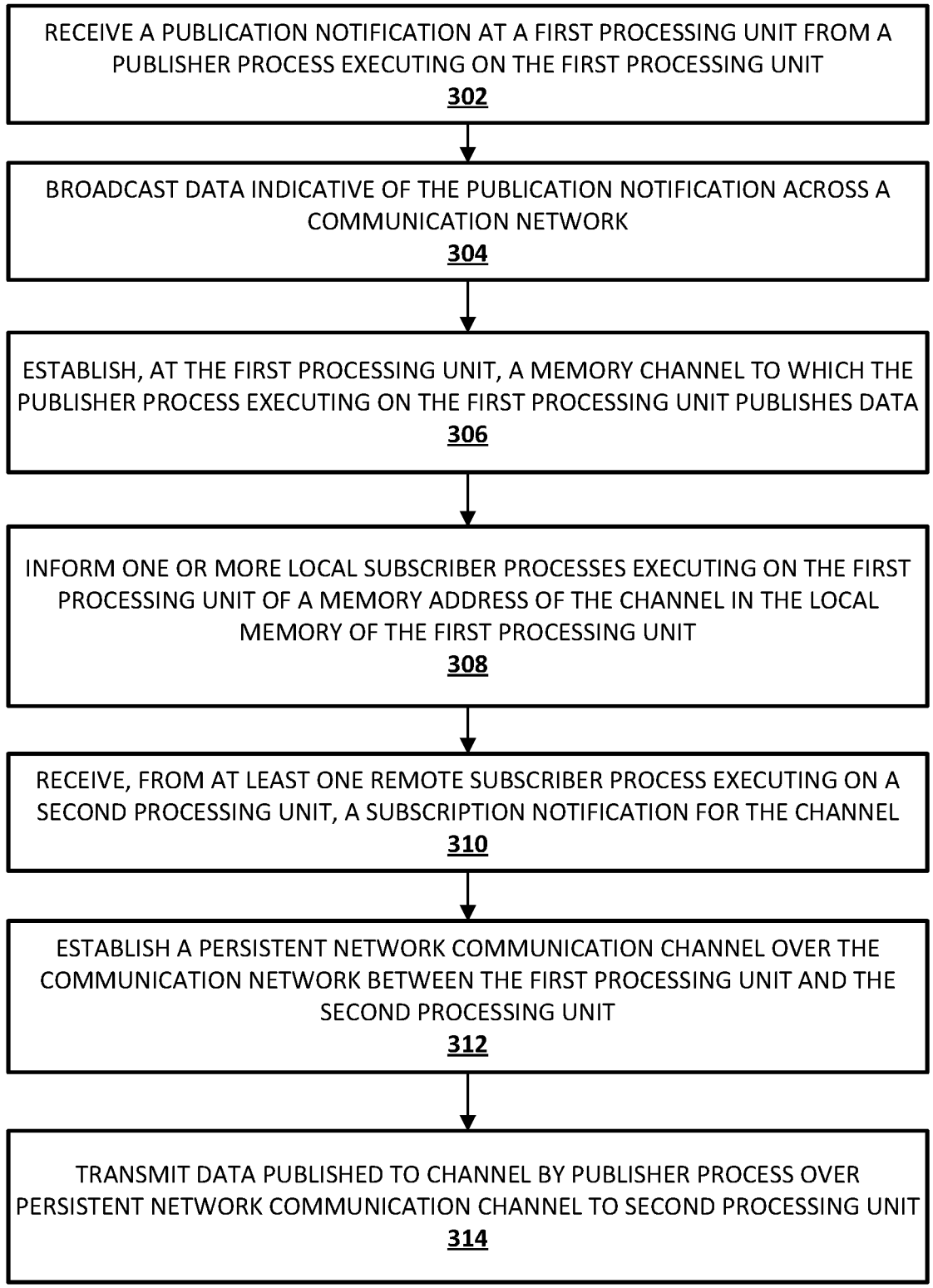
FIG. 3 depicts an example method for performing techniques described herein, in accordance with various implementations.

Referring now to FIG. 3, an example method 300 of making data stored in channels of shared memory available across a communication network is described. For convenience, the operations of flow charts are described with reference to a system that performs the operations. This system may include various components of various computer systems, including processing units of system 100. In some implementations, the operations of method 300 may be performed at least in part by an IPC service (e.g., 112, 212) executing on a particular processing unit. Moreover, while operations of method 300 are shown in a particular order, this is not meant to be limiting. One or more operations may be reordered, omitted or added.

At block 302, a publication notification may be received at a first processing unit of the system. In some implementations, the publication notification may be received from a publisher processes, i.e., a process that intends to publish message(s) to a channel. At block 304, data indicative of the publication notice, such as the publication notice itself, and in some cases a UDP port that will be used to "listen" to subscription requests to the channel, may be broadcast. At block 306 (which may occur before, simultaneously with, or after block 304), a channel may be established in a portion of memory local to the first processing unit that is used as shared memory. Thereafter, this may be the channel to which the publisher process publishes data such as messages.

At block 308, one or more local subscriber processes—i.e. other processes executing on the first processing unit that subscribe to the data published to the channel established at block 306, may be informed of a memory address or other identifier (e.g., a channel identifier) associated with the newly-established channel. In some implementations, the subscriber processes may merely learn the channel identifier, and the local IPC service may handle mapping between the channel identifier and the actual shared memory address of the channel. In other implementations, the subscriber process may receive the actual shared memory address, so that the subscriber process may read directly from the memory address, without the IPC service needing to intervene.

At block 310, a subscription notification may be received from at least one remote subscriber process executing on a second processing unit that is communicatively coupled with the first processing unit via a communication network. As noted above, in some implementations, the subscription notification may be addressed to the UDP port "listening" for such requests that was contained in (or accompanying) the data indicative of publication notice broadcast at block 304.

At block 312, a persistent network connection, such as a TCP connection or another type of channel, may be established between the first and second processing units. In some implementations, the persistent network connection may be established directly between the subscriber process and the publisher process, bypassing any type of intermediate IPC service. In other implementations, the persistent network connection may be established between IPC services operating on the first and second processing units.

At block 314, data published to the channel by the publisher process may be transmitted by the first processing unit across the persistent network connection to the second processing unit. In some implementations, the second processing unit, e.g., by way of the locally-executed IPC service, may allocate and maintain a local buffer for receiving remotely published data. In some implementations, whenever a remote publisher process publishes data to a channel (hosted remotely) that is subscribed to by a locally-executing subscriber process, that data may be received via a persistent network connection established for the channel previously. Then, the subscriber process may Poll the locally-executing IPC process for new messages. Channel identifiers associated with any subscribed-to channels—whether a channel in local shared memory or in the aforementioned local buffer for receiving remotely published data—that have new messages may be obtained by the subscriber process, which then may call the ReceiveMessage function on those channel identifiers.

From the foregoing it should be evident that techniques described herein may provide various technical advantages. For example, the techniques described herein allow for new channels to be added at any time. While in many instances the majority of channels will be added at system startup, this will not always be the case, and so avoiding static lists of channels and/or persistent network connections between various processes may make the system more scalable. Also, if a subscriber process goes offline, intentionally or accidentally (e.g., due to it crashing or the processing unit on which it executes crashing), the persistent network connection to the subscriber may also be dropped. Without the persistent network connection being available, data published to the subscribed channel may not be transmitted over the network unless there are other remotely-executing subscriber processes that subscribe to the channel. Even so, network traffic may be reduced.

Figure 4:
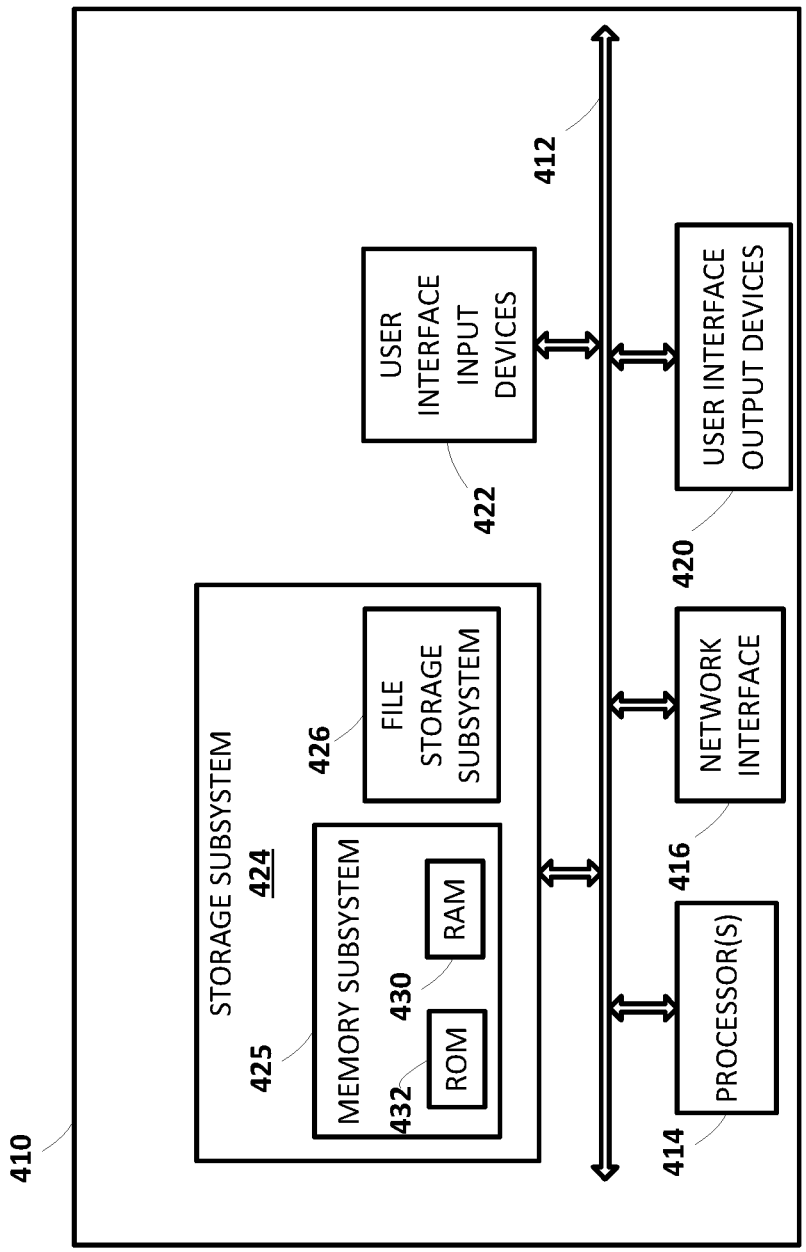
FIG. 4 schematically depicts an example architecture of a computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more aspects of IPC services, publisher processes, and/or subscriber processes. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a CD-ROM drive, an optical drive, or removable media cartridges. Modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A robot comprising at least first and second processing units that are communicatively coupled via a communication network that is integral with the robot:
   wherein the first processing unit includes:
      local memory,
      a channel to which a publisher process executing on the first processing unit publishes data, wherein the channel comprises at least a portion of the local memory that is used as shared memory, and
      one or more local subscriber processes executing on the first processing unit, wherein the one or more local subscriber processes are informed of a memory address of the channel in the local memory of the first processing unit, and wherein the one or more local subscriber processes subscribe to the channel to read data directly from the local memory of the first processing unit at the memory address using inter-process communication;
   wherein the second processing unit includes:
      at least one remote subscriber process executing on the second processing unit, wherein the remote subscriber process subscribes to the channel;
   wherein a persistent network connection is established over the communication network between the first processing unit and the second processing unit in response to a determination that the remote subscriber process subscribes to the channel; and
   wherein data published to the channel by the publisher process is read from the local memory of the first processing unit by or on behalf of one or more of the local subscriber processes, and wherein a copy of the data published to the channel is transmitted by the first processing unit over the communication network to the second processing unit using the persistent network connection.

2. The robot of claim 1, wherein a publication notification is broadcast across the communication network, wherein the publication notification informs one or more remote processes executing on one or more of the processing units of the robot that the publisher process publishes data on the channel.

3. The robot of claim 1, wherein a subscription notification broadcast across the communication network informs the publisher process that the remote subscriber process subscribes to the channel.

4. The robot of claim 1, wherein the persistent network connection comprises a transmission control protocol ("TCP") connection.

5. The robot of claim 1, wherein the communication network comprises a broadcast network.

6. The robot of claim 1, wherein the processing units of the robot include one or more of a real time processing unit and a perception processing unit.

7. The robot of claim 1, wherein the channel is implemented in the local memory of the first processing unit as a ring buffer.

8. The robot of claim 1, wherein the channel comprises a first channel, and the publisher process is subscribed to a second channel to which another publisher process executing on a given processing unit of the processing units of the robot publishes data, wherein the second channel comprises at least a portion of local memory of the given processing unit that is used as shared memory.

9. A method of exchanging data between a plurality of processing units that are communicatively coupled via a communication network, the method comprising:
   establishing, at a first processing unit of the plurality of processing units, a channel to which a publisher process executing on the first processing unit publishes data, wherein the channel comprises at least a portion of local memory of the first processing unit that is used as shared memory;
   informing one or more local subscriber processes executing on the first processing unit of a memory address of the channel in the local memory of the first processing unit, wherein the one or more local subscriber processes subscribe to the channel to read data directly from the local memory of the first processing unit at the memory address using interprocess communication;
   determining that at least one remote subscriber process executing on a second processing unit of the plurality of processing units subscribes to the channel; and
   establishing, at the first processing unit based on the determining, a persistent network connection over the communication network with the second processing unit;
   wherein data published to the channel by the publisher process is read directly from the local memory of the first processing unit by or on behalf of one or more of the local subscriber processes, and wherein a copy of the data published to the channel is transmitted by the first processing unit over the communication network to the remote subscriber process using the persistent network connection.

10. The method of claim 9, further comprising broadcasting a publication notification across the communication network, wherein the publication notification informs one or more remote processes executing on one or more processing units of the plurality of processing units that the publisher process publishes data on the channel.

11. The method of claim 9, wherein the determining includes receiving a subscription notification broadcast across the communication network, wherein the subscription notification informs the publisher process that the remote subscriber process subscribes to the channel.

12. The method of claim 9, wherein the persistent network connection comprises a transmission control protocol ("TCP") connection.

13. The method of claim 9, wherein the communication network comprises a broadcast network.

14. The method of claim 9, wherein the plurality of processing units are integral components of a robot.

15. The method of claim 9, wherein the channel is implemented in the local memory of the first processing unit as a ring buffer.

16. The method of claim 9, wherein the channel comprises a first channel, and the method further comprises subscribing the publisher process to a second channel to which another publisher process executing on a given processing unit of the plurality of processing units publishes data, wherein the second channel comprises at least a portion of local memory of the given processing unit that is used as shared memory.

17. At least one non-transitory computer-readable medium comprising instructions that, in response to execution of the instructions by one or more processors, cause the one or more processors to perform the following operations:
   establishing, at a first processing unit of a plurality of processing units that are communicatively coupled via a communication network, a channel to which a publisher process executing on the first processing unit publishes data, wherein the channel comprises at least a portion of local memory of the first processing unit that is used as shared memory;
   informing one or more local subscriber processes executing on the first processing unit of the channel;
   determining that at least one remote subscriber process executing on a second processing unit of the plurality of processing units subscribes to the channel; and
   establishing, at the first processing unit based on the determining, a persistent network connection over the communication network with the second processing unit;
   wherein data published to the channel by the publisher process is read directly from the local memory of the first processing unit by or on behalf of one or more of the local subscriber processes, and wherein a copy of the data published to the channel is transmitted by the first processing unit over the communication network to the remote subscriber process using the persistent network connection.

18. The at least one non-transitory computer readable medium of claim 17, further comprising instructions that cause the one or more processors to broadcast a publication notification across the communication network, wherein the publication notification informs one or more remote processes executing on one or more processing units of the plurality of processing units that the publisher process publishes data on the channel.

19. The at least one non-transitory computer readable medium of claim 17, wherein the determining includes receiving a subscription notification broadcast across the communication network, wherein the subscription notification informs the publisher process that the remote subscriber process subscribes to the channel.

20. The at least one non-transitory computer readable medium of claim 17, wherein the persistent network connection comprises a transmission control protocol ("TCP") connection.

* * * * *